R. ADAMS.
ELASTIC PITMAN OR CONNECTING-ROD.
No. 172,903. Patented Feb. 1, 1876.
Fig. 1.
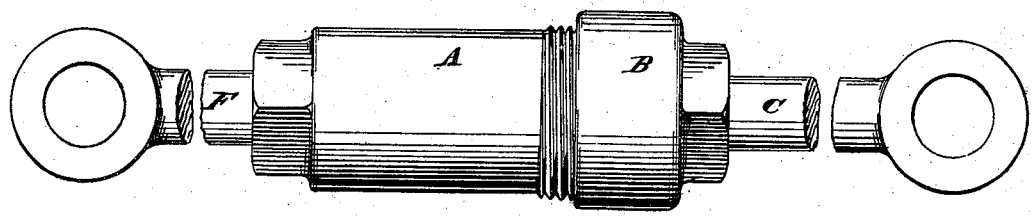
Fig. 3.
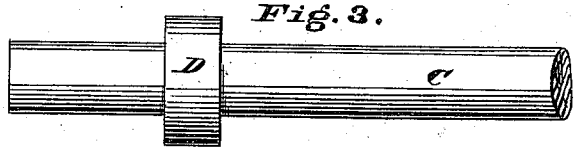
Fig. 2.
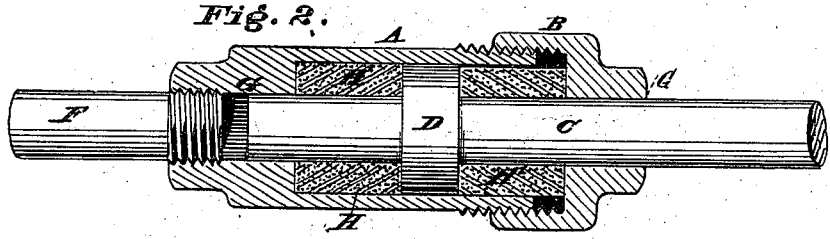
Fig. 4.   Fig. 5.
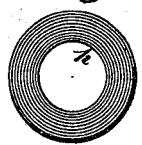 
Attest.                             Inventor.
Chas. H. Bauer                      Robert Adams
Thomas H. Pringle

UNITED STATES PATENT OFFICE.

ROBERT ADAMS, OF EAST ENTERPRISE, INDIANA.

IMPROVEMENT IN ELASTIC PITMEN OR CONNECTING-RODS.

Specification forming part of Letters Patent No. 172,903, dated February 1, 1876; application filed March 13, 1875.

*To all whom it may concern:*

Be it known that I, ROBERT ADAMS, of East Enterprise, in the county of Switzerland and State of Indiana, have invented certain new and useful Improvements in Elastic Pitmen; and I do hereby declare that the following is a full, clear, and exact description of the same.

The object of my invention is to provide a pitman which shall be elastic longitudinally, but shall be so constructed as to resist any lateral strain. The improvement consists in the general arrangement of its parts and in the provision of an air-chamber, in which the air is compressed by the action of the rod, and aids the rubber or other springs in sustaining the concussion consequent upon the rapid revolution of the crank and vibration of the cutter-bar in harvesters, thereby preventing the wear and tear of the various parts, and producing a smooth, easy, and uniform motion.

In order to enable others to make and use my invention, I would thus describe it, referring to the accompanying drawings, in which—

Figure 1 is a view of my pitman in connected form. Fig. 2 is a sectional view of the same longitudinally. Fig. 3 represents the piston-rod. Figs. 4 and 5 are, respectively, an end and side view of the rubber springs or cushions.

A represents a cylindrical case or shell, with a smooth uniform bore extending longitudinally two-thirds of its length. A smaller bore, G, continues from the center of the larger one through the case A, and is threaded near its end to admit the rod F, which is screwed tightly into it.

Fig. 3 shows the form of the rod which is fitted into the case A, and has only such motion in a longitudinal direction as is allowed it by two rubber springs or cushions. This rod is provided with a disk, D, which fits snugly into the larger bore of the shell A, and occupies a central position. The end of the rod fits snugly into the entrance of the smaller bore G, leaving an air-chamber between its end and that of the rod F. Upon each side of the disk are the rubber cushions or washers H H', encompassing the rod and filling up the entire space of the larger bore. The spring H' extends somewhat beyond the opening of the case.

To make all tight, and complete the apparatus, the cap B, having a central aperture, is slipped over the rod C, and is screwed upon the outer surface of the case A, which is threaded at its end. By means of this cap the springs can be always compressed to any desired degree, and their elasticity be thereby regulated. The ends of the rods C and F are provided with suitable means for connection to the other parts.

It will be noticed that the chamber G, in addition to serving as a reservoir for compressed air, acts also as a guide, and, together with the disk and the cap B, keeps the rod from moving laterally, while the springs allow it sufficient elasticity longitudinally.

I am aware that pitmen have been constructed employing rubber or other springs in the manner and for the purpose herein shown, but none of these have employed an air-chamber in connection with the springs, to aid in diminishing the concussion produced.

Having fully described my invention, I claim and desire to secure by Letters Patent—

The cylindrical shell or case A, having, in addition to the usual chamber, a smaller chamber, G, in combination with the rods C and F, disk D, rubber springs H H', and cap B, when arranged in such a manner that the end of the rod C enters the chamber G in the manner and for the purpose specified.

ROBT. ADAMS.

Witnesses:
THOS. J. PRINGLE,
D. L. WEST.